May 2, 1961 V. E. RIMSHA 2,982,474
ADJUSTABLE THERMOSTATIC MIXING VALVE
Filed Sept. 21, 1956 4 Sheets-Sheet 1

INVENTOR.
VICTOR E. RIMSHA
BY
ATTORNEYS

United States Patent Office 2,982,474
Patented May 2, 1961

2,982,474

ADJUSTABLE THERMOSTATIC MIXING VALVE

Victor E. Rimsha, Chicago, Ill., assignor to The Dole Valve Company, Chicago, Ill., a corporation of Illinois Filed Sept. 21, 1956, Ser. No. 611,152

2 Claims. (Cl. 236—12)

This invention relates to improvements in thermostatic fluid mixing valves and more particularly relates to such valves in which the delivery temperature of the water may be selected.

A principal object of the invention is to provide an improved form of thermostatically controlled valve for mixing hot and cold water, adjustable to deliver water at a controlled tempearture, at any temperature from the temperature of the cold water entering the valve to the temperature of the hot water entering the valve.

Another object of the invention is to provide a thermostatic cyclically controlled mixing valve particularly adapted for washing machines and the like and operable under the cyclic control of the machine for supplying water at various temperatures independently preselected for the separate washing and rinsing operations from the temperature of the cold water entering the valve to that of the hot water entering the valve.

A still further object of the invention is to provide an improved form of mixing valve in which the temperature of the water delivered by the valve for the separate washing and rinsing operations may be independently manually preselected and in which the temperature is maintained by an electrically heated thermal element arranged to shift and maintain a temperature control thermal element in position to effect the delivery of water from the valve at a selected temperature.

A still further object of the invention is to provide a thermostatic mixing valve having a central mixing chamber with a thermal element adjustably mounted in the mixing chamber for controlling the tempering of the water therein, in which manually operable means are provided to vary the position of the thermal element in accordance with a selected delivery temperature of the water and in which an electrically heated second thermal element is provided to shift the temperature adjustment means into its adjusted position and to maintain the thermal element in its adjusted position in the mixing chamber to effect the delivery of water at the selected temperature.

These and other objects of the invention will appear from time to time as the following specification proceeds and with reference to the accompanying drawings wherein.

Figure 1:
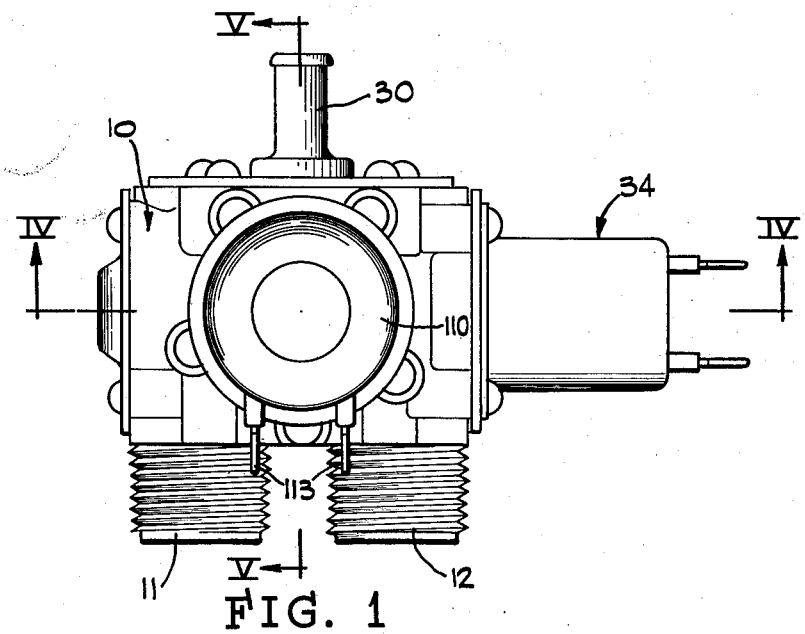
Figure 1 is a top plan view of a mixing valve constructed in accordance with the invention.
Figure 2:
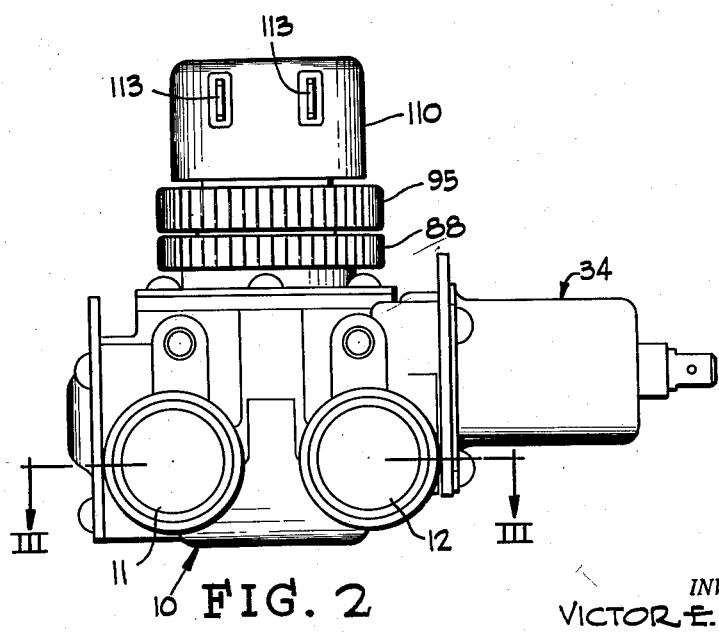
Figure 2 is a view in side elevation of the valve shown in Figure 1.

In the embodiment of the invention illustrated in the drawings, the valve is shown as comprising a valve body 10, having hot and cold water inlets 11 and 12, respectively, leading into a metering chamber 13, having a central aligned mixing chamber 14 in direct communication with one end thereof.

The valve body 10 may be molded from one of many of the well known forms of thermoplastic materials, although it need not be made from such materials and may be made from metal, if desired. One form of thermoplastic material, which has been found to be satisfactory for such valves, is a "Nylon" thermoplastic material, which may readily be molded to the desired from and which is unaffected by the heat of the hot water entering the valve.

Figure 4:
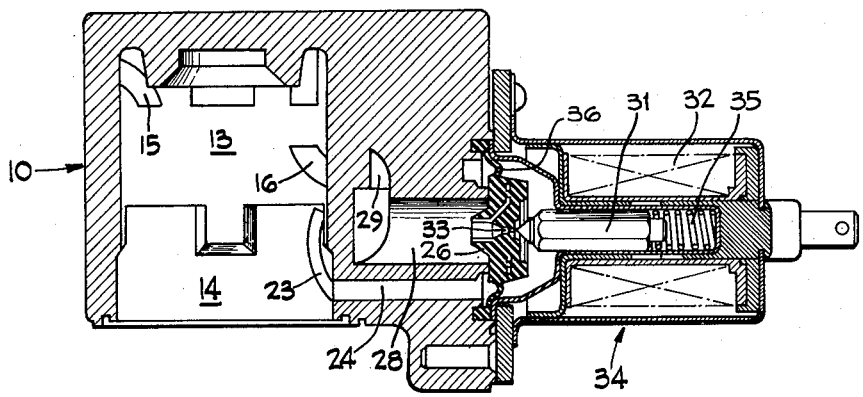
Figure 4 is a sectional view taken substantially along line IV—IV of Figure 1, with certain parts removed in order to show the fluid passageways leading to and from the mixing chamber of the valve.
Figure 3:
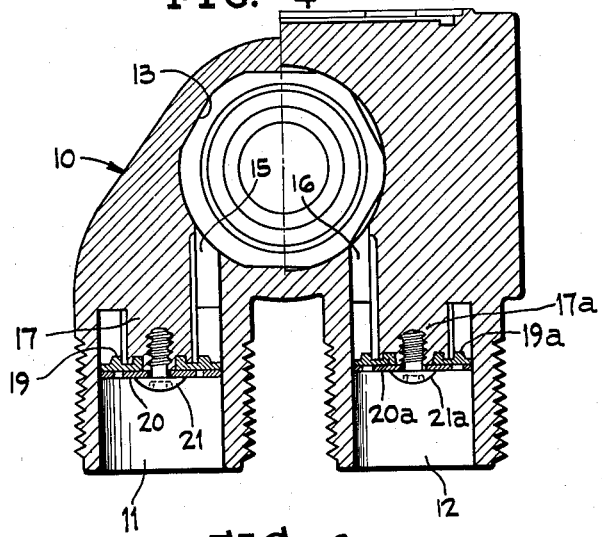
Figure 3 is a sectional view taken through the hot and cold water inlets substantially along the line III—III of Figure 2 and showing the passageways from the hot and cold water inlets to the mixing chamber of the valve.

The hot water inlet 11 is shown in Figures 3 and 4 as leading directly to the metering chamber 13 and as communicating therewith through a port 15. The cold water inlet 12 also communicates directly with the metering chamber 13 through a port 16 spaced vertically from the hot water inlet port 15 toward the mixing chamber 14.

The hot water inlet 11 has a boss 17 spaced inwardly of the wall thereof and extending therealong for a portion of the length thereof and terminating short of the inlet end of said inlet. The outer end of the boss 17 forms a seat for the inner marginal portion of a resilient annular check valve 19, secured to said boss at its inner margin and extending outwardly from said boss into engagement with the wall of the cold water inlet. The check valve 19 is abutted at its outer face by an apertured washer 20 retained in position on the boss 17 by a screw 21 threaded within said boss and engaging the outer face of said apertured washer. Water entering the hot water inlet 11 thus flows through the apertures of the apertured washer 20 and flexes the check valve 19 inwardly with respect to the outer face of the bass 17 away from the wall of the inlet, to accommodate the flow of hot water into the metering chamber 13, but to block the backflow from the mixing chamber to the hot water inlet.

In a like manner, the cold water inlet 12 has a boss 17a spaced inwardly of the wall thereof and terminating short of the inlet end of said inlet. Said boss has a resilient annular check valve 19a thereon, like the check valve 19, and maintained in position on said boss by an apertured washer 20a secured thereto by a screw 21a.

The mixing chamber 14 has a port 23 in the wall thereof, having communication with an annular passageway 24 opening to one side of the valve body and closed by a solenoid controlled pressure operated diaphragm valve 26. When the diaphragm valve 26 is open, water at the temperature of the water in the mixing chamber 14 will flow through a central port and seat 28 through a passageway 29 leading from the port 28 and having communication with an outlet 30 from the valve body 10.

The valve 26 is a well known form of pressure operated solenoid controlled diaphragm valve in which an armature 31 of a solenoid 34 is slidably guided within a magnet coil 32 of the solenoid and is engaged with a central orifice 33 leading through the diaphragm valve by a spring 35. The diaphragm valve has a bleeder passageway 36 leading therethrough to pass water from one side of the diaphragm to the other and create a pressure differential on both sides of the diaphragm when the orifice 33 is closed by engagement with the armature 31, to maintain the valve closed by the pressure of the water acting on the outer face thereof. Upon energization of the magnet coil 32, the armature 31 will move out of engagement with the central orifice 33, relieving pressure from the outer side of the diaphragm valve 26 to effect the opening of said diaphragm valve by the pressure of fluid on the under side thereof.

Figure 5:
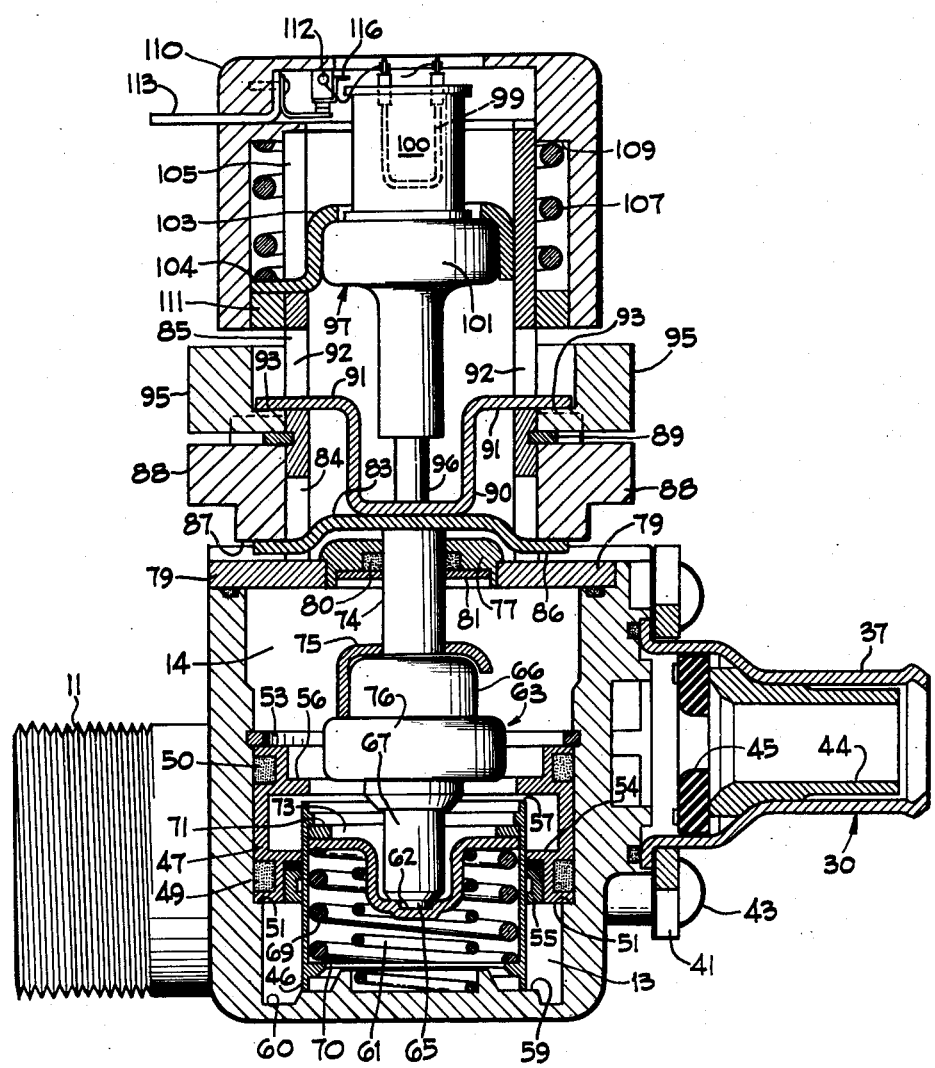
Figure 5 is a sectional view taken substantially along line V—V of Figure 1, showing the valve set to deliver cold water.

The outlet 30 is shown in Figure 5 as being in the form of a metal fitting 37 sealed to the opposite wall of the valve body from the inlets 11 and 12 and retained in sealing engagement with the valve body by a yoke 41 engaging said fitting and secured to the valve body as by self-tapping screws 43 extending through said yoke and threaded within the valve body 10.

The fitting 37 is shown as having a generally tubular seating and passageway member 44 extending therealong, the inner wall of which forms the outlet 30 from the valve. The inner face of the passageway member 44 is shown as forming a seat for a resilient flow control device 45 for maintaining a substantially uniform rate of flow through the outlet 30 regardless of variations in inlet pressure entering the valve body through the inlets 11 and 12, on principles clearly shown and described in Patent No. 2,454,929 which issued to Leslie A. Kempton on November 30, 1948 and no part of the present invention so not herein shown or described further.

A hollow piston valve 46 is provided to meter hot and cold water into the metering chamber 13 and mixing chamber 14 through the inlet ports 15 and 16, respectively, leading through the wall of said metering chamber. The piston valve 46 is guided within a generally cylindrical insert 47 extending along the wall of the metering chamber 13 and apertured to accommodate the flow of cold water therethrough from the cold water inlet port 16. The insert 47 is sealed to the wall of the chamber 13 by spaced seals 49 and 50 and is retained in engagement with inwardly extending stops or shouldered portions 51 extending inwardly from the wall of the metering chamber by a retainer ring 53, which may be a snap-ring snapped in the wall of the chamber 13 into engagement with the outer end of the insert 47. The insert 47 is provided with an inwardly extending flanged portion 54 extending from the inner end thereof and sealed to the wall of the piston valve 46, as by a sealing member 55.

The insert 47 is also provided with a flange 56 extending inwardly therefrom adjacent the outer end thereof and forming a seat for an annular end valve face 57 of the piston valve 46. The opposite end of the piston valve 46 is seated against an annular seat 59 shown as being formed integrally with an end wall 60 of the metering chamber 13.

A spring 61 seated at one end in the end wall 60 within the annular face 59 and at its opposite end on a stirrup 62 for the thermal element 63 is provided to bias the piston valve 46 into engagement with the face of the flange 56 and block the flow of cold water into the mixing chamber 14 and accommodate hot water to flow thereinto and also to retract an extensible power member 65 of the thermal element 63 upon cooling of said thermal element.

The thermal element 63 is shown as being of the so-called power type of thermal element wherein a fusible thermally expansible material contained within a casing 66 of the thermal element extends the power member or piston 65 from a cylinder 67 of the thermal element as the temperature of water in the mixing chamber 14 approaches the fusion point of the thermally expansible material, as shown and described in Patent No. 2,368,181 which issued to Sergius Vernet on January 30, 1945 and no part of our present invention so not herein shown or described further.

The stirrup 62 against which the power member 65 of the thermal element 63 reacts is maintained in position within the piston valve 46 by an overtravel spring 69 seated at one end on an annular rib 70 extending inwardly from the wall of the piston valve 46 and seated at its opposite end on the stirrup 62 and maintaining said stirrup in engagement with a snap-ring 71 engaging an annular rib 73 extending inwardly from the wall of the piston valve 46 adjacent the valve face 57 thereof.

The thermal element 63 is guided for slidable movement along the mixing chamber 14 by a shaft or pin 74 extending from a spider 75 encircling the casing 66 of the thermal element and engaging a clamping ring 76 of said thermal element.

The pin 74 extends through and is mounted for slidable movement along a sealing plate 77 carried in an end plate 79 suitably secured to the end of the valve body and sealed thereto. An O-ring 80 recessed within the sealing plate 77 has sealing engagement with the pin 74 and is retained in sealing engagement therewith as by a retainer plate 81.

The thermal element 63 is maintained in position in the mixing chamber 41 to effect the delivery of water through the outlet 30 at a selected temperature for the washing operation by the reaction of the pin 74 against a reaction member or follower 83 guided in slots 84 of a guide 85, herein shown as being cylindrical and secured to and extending outwardly from the end plate 79.

The follower 83 has oppositely projecting legs 86 extending through and beyond the guides 84 having oppositely sloping end faces conforming to the angles of sloping cam faces 87 on the undersurface of a wash cam 88. The wash cam 88 rotatably engages the outer wall of the guide 85 and is retained to said guide as by a snap-ring 89 engaging the opposite face of said wash cam from the cam faces 87 thereof.

When the wash cam 88 is in the extreme cold position shown in Figure 5 the thermal element 63 will be in its inwardly extended position with respect to the piston valve 46 and mixing chamber 14 and will be thermostatically inoperative. This will maintain the piston valve 46 in engagement with the annular seat 59 and block the passage of hot water into the mixing chamber 14. Cold water entering the mixing chamber through the port 16 may then be delivered through the outlet 30 of the valve upon energization of the magnet coil 32 and opening of the valve 26.

Figure 6:
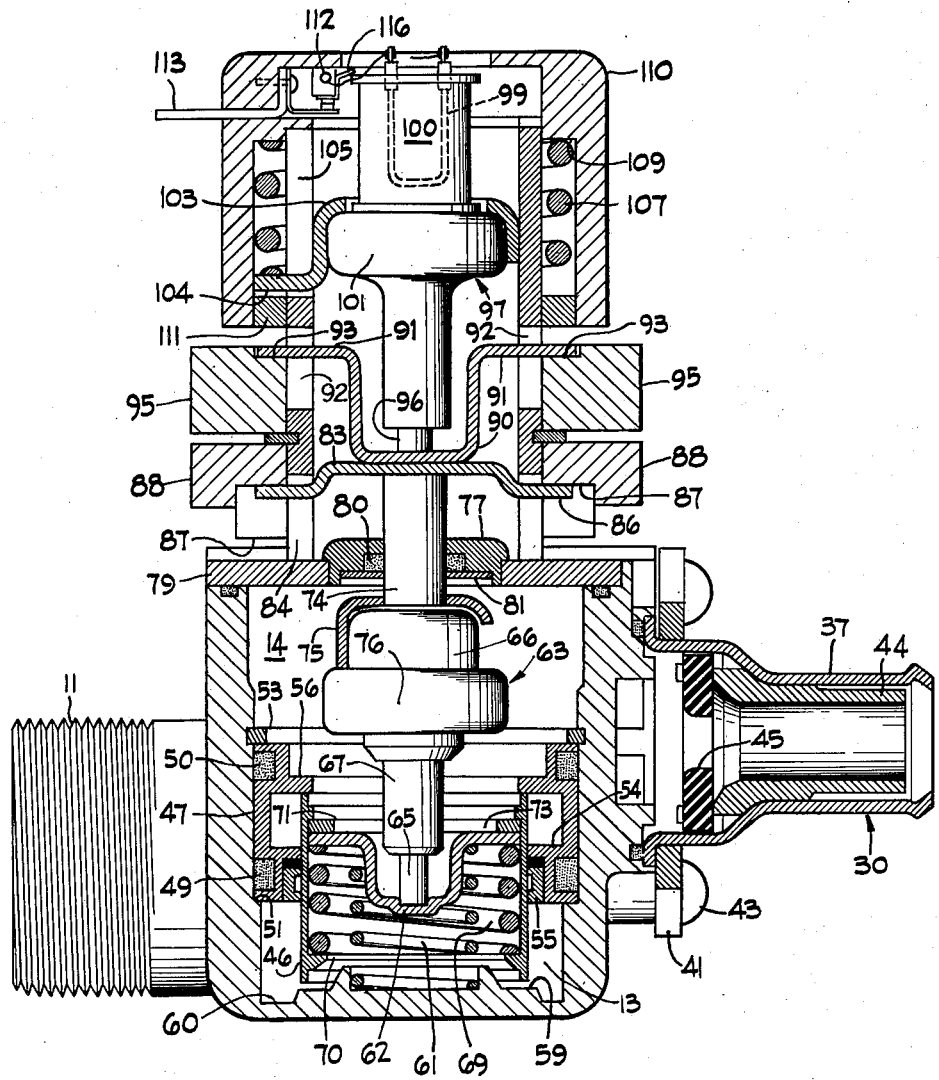
Figure 6 is a view somewhat similar ot Figure 5, but showing the valve set to deliver hot water.

When the wash cam 88 is turned to the position shown in Figure 6, the thermal element 63 is in its extreme outwardly extended extreme hot position with respect to the mixing chamber 14 and will be thermostatically inoperative under normal household hot water temperatures. The spring 61 will then engage the annular valve face 57 with the face of the flange 56 and disengage the opposite face of the piston valve 46 from the seat 59. This will block the passage of cold water into the mixing chamber 14 and effect the delivery of hot water into said mixing chamber and out the outlet 30 upon opening of the valve 26.

As the hot water entering the mixing chamber flows around the casing 66 of the thermal element 63 the power member 65 will extensibly move with respect to the cylinder 67. This, however, will at first have no effect on the piston valve 46 since the thermal element will back away from said valve and extend the pin 74 outwardly from the sealing plate 77, causing movement of the follower 83 into engagement with the cam face 87, at which time the thermal element 63 will react against a solid abutment. In this position of the thermal element 63, however, further movement of the power member 63 will be insufficient to block the flow of hot water to the mixing chamber 14 except upon extreme over temperature conditions and failure of the cold water supply.

When the cam 88 is in any intermediate position between the position shown in Figure 5 and that shown in Figure 6, the thermal element 63 will back away from the piston valve 46 under the influence of hot water and bring the follower 83 into engagement with the sloping cam faces 87 at which time the thermal element 63 will be thermostatically effective to engage the piston valve 46 with the seat 59 and to accommodate the spring 61 to engage the annular valve face 59 with the flange 56 in accordance with variations in temperature of the water within the mixing chamber 14 to attain tempered water in said mixing chamber for delivery through the outlet 30 at an infinite variety of temperatures determined by the degree of rotation of the wash cam 88 and the positions of the cam faces thereof with respect to the legs 86 of the follower 83.

The position of the thermal element 63 within the mixing chamber 14 and the resultant temperature of the water in the mixing chamber 14 and delivered through the outlet 30 for the rinsing operation is controlled by a rinse cam follower 90 abutting the follower 83 and having laterally extending legs 91 extending through and guided for movement along guide slots 92 of the guide 85 and having sloping end portions engaging sloping cam faces 93 of a rinse cam 95. The rinse cam 95 extends about the outer wall of the guide 85 and abuts the snap-ring 89 at its undersurface.

The sloping end portions of the legs 91 of the rinse cam follower 90 are moved into and maintained in engagement with the sloping cam faces 93 of the rinse cam 95 by an extensible power member 96 of a thermal element 97, like the thermal element 63 but internally heated for the rinsing operation by a resistor heater 99 contained within a casing 100 for the thermally expansible material of the thermal element. It should be here be understood that while the resistor heater is shown as being contained within the casing of the thermal element that it also may encircle the casing, if desired.

The thermal element 97 has a clamping ring 101 carried within a cage or spider 103 extending about said clamping ring and having legs 104 extending through guide slots 105 formed in the wall of the guide 85 and biased into engagement with the clamping ring 101 by a spring 107 encircling the outer wall of the guide 85.

The spring 107 is seated on the ends of the legs 104 at one end and on an annular shoulder 109 of a cap 110 at its opposite end. The cap 110 is shown as extending over the top of the guide 85 and downwardly along the wall thereof in outwardly spaced relation with respect thereto and as engaging a ring 111 at its lower end portion. The ring 111 extends within the wall of the cap 110 and around the outer wall of the guide 85 and is suitably secured to said guide and cap to retain said cap in position on said guide.

The resistor heater 99 is energized under the control of a normally closed switch 112. Spade terminals 113 connected with a source of power, secured to and extending through the wall of the cap 110, are electrically connected with said switch and resistor heater. The switch 112 is mounted underneath the top of the cap 110 and has a switch arm 116 extending over the edge of the casing 100 of the thermal element 97 to be engaged by said casing and open the contacts of said switch to deenergize the resistor heater 99 upon a predetermined travel of the thermal element 97 against the spring 107.

Assuming that the spade terminals 113 are connected to be energized under the control of the cyclic timer of a washing machine, the resistor heater 99 of the thermal element 97 will be energized for the rinsing cycle. This will effect extensible movement of the power member 96 and engagement of the legs 91 of the follower 90 with the sloping cam faces 93 of the rinse cam 95. This is based on the assumption that the wash cam 88 is turned to a higher temperature position than the rinse cam 95 to accommodate the pin 74 and follower 83 to follow the follower 90 upon extensible movement of the power member 65 of the thermal element 63. For example wash cam 88 might be in the position shown in Figure 6 while the rinse cam 95 might be in the position shown in Figure 5.

As the power member 96 brings the legs 91 of the follower 90 into engagement with the sloping cam surfaces 93, further extensible movement of the power member 96 will cause the thermal element 97 to move back against the spring 107. This will effect engagement of the casing 100 with the switch arm 116, to open the contacts of the switch 112 and deenergize the resistor heater 99. The spring 107 being compressed will then move the spider 103 and thermal element 97 toward the follower 90 to effect disengagement of the casing 100 from the switch arm 116 and the energization of the resistor heater 99. This back and forth movement of the thermal element 97 continues during the rinse cycle as long as energy is supplied to terminals 113 and follower 90 is engaged with cam 95.

The compression spring 107 is so loaded that pressure will be exerted by the power member 96 on the follower 90 which will be sufficient to offer sufficient reaction against backward movement of the thermal element 63 with respect to the piston valve 46 to maintain said thermal element in position in the mixing chamber 14 to effect the delivery of water at the temperature selected by the rinse cam 95 for the rinsing operation. Thus, an infinite number of temperatures of the water may be selected for rinsing the clothes by turning the rinse cam 95 from its cold position shown in Figure 5 to its hot position shown in Figure 6 and a simple and accurate control for the temperature of the water delivered through the outlet 30 is attained.

It is contemplated that the wash cam 88 and rinse cam 95 might be keyed together or made integral and so shaped as to give an adjustable temperature for the wash water with a constant differential between the temperature of the wash water and the temperature of the rinse water.

It will be understood that various modifications and variations of the present invention may be effected without departing from the spirit and scope of the novel concepts thereof.

I claim as my invention:

1. In a thermostatic mixing valve, a valve body having a chamber therein, a hot water inlet in said body leading into said chamber, a cold water inlet in said body leading into said chamber, an outlet in said body leading from said chamber, a shut-off valve associated with said outlet for starting and stopping flow therethrough, a metering valve in said chamber for metering the flow of hot and cold water thereinto from said inlets when said shut-off valve is open, a thermally responsive element in said chamber for controlling the temperature of mixed water flowing through said outlet and having an extensible power member operatively associated with said metering valve, a first cam follower outside said body operatively associated with said thermally responsive element, a first cam outside said body cooperable with said first cam follower and operable to adjust the control temperature of said thermally responsive element for a first operation of said mixing valve, a second cam follower outside said body on the other side of said first cam follower from said thermally responsive element and operatively associated with said first cam follower and said thermally responsive element, a second cam outside said body on the other side of said first cam from said thermally responsive element and cooperable with said second cam follower and operable to adjust the control temperature of said thermally responsive element for a second operation of said mixing valve, a second thermally responsive element outside said body on the other side of said second cam follower from said first cam follower and having an extensible power member operatively associated with said second cam follower, and an electric heater associated with said second thermally responsive element and energizable to extend the power member therefrom to shift said first cam follower out of engagement with said first cam and shift said second cam follower into engagement with said second cam to shift the control temperature of said first thermally responsive element from that selected for said first operation of said mixing valve to that selected for said second operation of said mixing valve, said metering valve, said thermally responsive elements, said cams and said cam followers being each concentric with one another.

2. In a thermostatic mixing valve, a valve body having a chamber therein, a hot water inlet in said body leading into said chamber, a cold water inlet in said body leading into said chamber, an outlet in said body leading from said chamber, a metering valve in said chamber for metering the flow of hot and cold water thereinto from said inlets, an elongated thermal element in said chamber for controlling the temperature of mixed water flowing through said outlet, a first cam follower operatively associated with said thermal element, a first cam cooperable with said first cam follower and operable to adjust the control temperature of said thermal element for a first operation of said mixing valve, a second cam follower operatively associated with said first cam follower and said thermal element, a second cam cooperable with said second cam follower and operable to adjust the control temperature of said thermal element for a second operation of said mixing valve, a second elongated thermal element operatively associated with said second cam follower, and heating means energizable to heat said second thermal element, said second thermal element being effective on heating to shift said first cam follower out of engagement with said first cam and shift said second cam follower into engagement with said second cam to shift the control temperature of said first thermal element from that selected for said first operation of said mixing valve to that selected for said second operation of said mixing valve, said metering valve, said thermal elements, said cams and said cam followers being in coaxial alignment with one another.

References Cited in the file of this patent

UNITED STATES PATENTS

| | | |
|---|---|---|
| 1,225,887 | Swan | May 15, 1917 |
| 1,244,184 | Dunwoodie | Oct. 23, 1917 |
| 2,216,246 | Larson | Oct. 1, 1940 |
| 2,442,886 | Bowen | June 8, 1948 |
| 2,489,896 | Kempton | Nov. 29, 1949 |
| 2,548,516 | Cantalupo | Apr. 10, 1951 |
| 2,584,417 | Branson | Feb. 5, 1952 |
| 2,657,859 | Wangenheim | Nov. 3, 1953 |